United States Patent [19]

Schiller

[11] 4,350,602
[45] Sep. 21, 1982

[54] FUSING FLUID FOR SOLDER-PLATED CIRCUIT BOARDS

[76] Inventor: Harold Schiller, 3521 Greenbrier Rd., Long Beach, Calif. 90808

[21] Appl. No.: 218,004

[22] Filed: Dec. 18, 1980

Related U.S. Application Data

[63] Continuation-in-part of Ser. No. 198,604, Oct. 20, 1980, abandoned.

[51] Int. Cl.$^3$ .......................... C09K 5/00; H05K 3/34
[52] U.S. Cl. ........................................ 252/75; 75/257; 252/77; 252/78.1; 427/444
[58] Field of Search ................. 252/75, 77, 78.1, 149; 427/444; 75/257; 260/33.2 R, 33.4 R

[56] References Cited

U.S. PATENT DOCUMENTS 3,779,927 12/1973 Howell et al. ..................... 252/75

Primary Examiner—Dennis L. Albrecht
Attorney, Agent, or Firm—Lawrence Fleming

[57] ABSTRACT

An improved fusing fluid or protectively coating solder-plated printed circuit conductors while they are heated to fuse the solder. Certain prior fusing fluids tend to pull away from portions of the molten solder surface, leaving them unprotected from oxidation. The improved fluid contains a small percentage of phenothiazine or a homologue, which promote complete wetting of the solder surface without causing the foaming and cleaning difficulties associated with surfactants.

7 Claims, No Drawings

FUSING FLUID FOR SOLDER-PLATED CIRCUIT BOARDS

REFERENCE TO RELATED APPLICATION

This is a continuation-in-part of my prior application Ser. No. 198,604, filed Oct. 20, 1980, now abandoned.

TECHNICAL FIELD

This invention relates to the art of manufacturing electronic printed circuit boards and in particular to solder-plated boards. In such boards the copper conductors, which are commonly of etched foil, are electroplated with solder, usually a lead-tin solder.

As plated, the solder layer may typically be porous and dull in appearance, and may have slivers or other defects. Hence it is usual to melt or fuse the plated solder layer of coating, which after refreezing has a smooth shiny surface, longer shelf life, and improved solderability, as well as freedom from other defects.

Two common methods of such fusing are: (1) immersion in a liquid bath of a heat transfer fluid held at a temperature above the melting point of the solder, e.g., at about 204° C. to 232° C. (400° F. to 450° F.). This method is here called pot fusing; and (2) Infra-red radiant heating, as on a conveyor in a suitable tunnel. This second method is herein called radiation fusing. In it, the solder plating must first be coated with a suitable fusing fluid. (Fusing fluids of such types have been called "fluxes" in some earlier trade literature.)

This invention is an improved fusing fluid and method for radiation fusing. Such radiation fusing fluids are typically fairly viscous, and coated onto the circuit boards by roller. A thinner such as isopropyl alcohol is commonly included to facilitate coating, and then evaporated off during the fusing process. The fusing fluid residue left on the boards after processing should be water-soluble to facilitate cleaning.

Typical prior fusing fluids of this type have four essential components: (a) a volatile solvent such as isopropyl alcohol; (b) non-volatile water-soluble components selected from the group consisting of polyethylene glycols, polyethylene-polypropylene glycols, or other high molecular weight water-soluble compounds; (c) a surfactant, usually of the non-ionic type and commonly an ethoxylated alkyl phenol; and (d) an activator such as an organic acid chloride or hydrochloric acid. The function of component (c), the surfactant, is to ensure that the fusing fluid covers the whole surface of the solder layer during fusing, while the solder is molten, and until the solder freezes.

Without the presence of the surfactant as an ingredient in the fusing fluid, the prior fluid will not wet completely the surface of the solder, but will tend to pull away from portions of the surface, leaving them uncoated. These uncoated areas become oxidized. When the solder refreezes, lines of demarcation become visible between the coated and uncoated areas; the result is not generally acceptable to the industry.

However, this use of surfactants causes a fusing fluid to have certain undesirable properties, i.e., (1) generation of foam and suds in rinse water systems during removal of the fluid residues from the fused board by water washing; (2) difficulties in removing the fusing fluid residues from the fused board due to the slow rate of solution of the residues cause by the surfactant.

This invention addresses the problem of providing a fusing fluid for radiation fusing which will effectively wet the molten solder surface, avoid the production of stable foam or suds, and permit the fusing fluid residues to be easily removed by water washing.

BACKGROUND ART

In pot fusing, Method (1) above, it is known to use as ingredients in the heat transfer fluid, surfactants and/or polyglygols with or without antioxidants. Antioxidants are used to extend the pot life of the heat transfer fluid, which may run as long as a week. The surfactants create foaming and cleaning difficulties of the sort described above in connection with radiation fusing fluids.

Pot fusing is the process most nearly related to radiation fusing; but this invention relates to the latter.

DESCRIPTION (NO DRAWING)

I have found that the addition of a small percentage of phenothiazine or its homologue, dioctyl phenothiazine, to radiation fusing fluids in place of the surfactant will improve their performance. The improvement is in the prevention of the incomplete wetting or pulling-away of the fluid from portions of the solder surface—so that with the improved fluid of the invention the solder-plated surface remains completely covered with the fusing fluid, and without the undesirable foaming and rinsing difficulties encountered with the above-described use of surfactants.

Phenothiazine and dioctyl phenothiazine are known as antioxidants; and phenothiazine has also been used for medicinal purposes as a vermifuge, but they are not wetting agents or surfactants.

For the present purpose I have found that phenothiazine or dioctyl phenothiazine can be employed in fusing fluids in a range from about 0.05 percent to 5 percent by weight, and preferably from about 0.1 percent to 0.2 percent by weight. Five percent by weight will confer substantially the same improvement as 0.1 to 0.2 percent but with disadvantages in cost, odor, and cleanup. The phenothiazines are more expensive than the other ingredients, have an unpleasant odor, and are insoluble in water.

Following are examples of prior art radiation fusing fluids:

|  | % by volume |
|---|---|
| Prior Art Example I | |
| Polyethylene Glycol (av. mol. wt. 1000) | 12 |
| Polyglycol 15-200(1) | 12 |
| Surfactant, Triton X-100(5) | 24 |
| Hydrochloric Acid | 2 |
| Isopropyl Alcohol | 50 |
| Prior Art Example II | |
| Jeffox WL-1400(3) | 30 |
| Surfactant, Triton N-101(5) | 20 |
| Hydrochloric Acid | 2 |
| Isopropyl Alcohol | 48. |

Following are examples of radiation fusing fluids according to the present invention:

|  | % by volume |
|---|---|
| Invention Example I | |
| Polyethylene Glycol (av. mol. wt. 1000) | 20 |
| Jeffox WL-1400(3) | 10 |
| Jeffox WL-660(4) | 10 |
| Isopropyl Alcohol | 59 |
| Hydrochloric Acid | 1 |

| | % by volume |
|---|---|
| To which is added Phenothiazine, 0.2% by weight. | |
| Invention Example II | |
| Jeffox WL-660[4] | 45 |
| Isopropyl Alcohol | 53 |
| Hydrochloric Acid | 2 |
| To which is added Phenothiazine, 0.15% by weight. | |
| Invention Example III | |
| Polyethylene Glycol (av. mol. wt. 600) | 30 |
| Polyglycol 15-200[1] | 20 |
| Isopropyl Alcohol | 49 |
| Hydrochloric Acid | 1 |
| To which is added Phenothiazine, 0.1% by weight. | |
| Invention Example IV | |
| Polyethylene Glycol (av. mol. wt. 600) | 20 |
| Jeffox WL-1400[3] | 30 |
| Isopropyl Alcohol | 49 |
| Hydrochloric Acid | 1 |
| To which is added Phenothiazine, 0.2% by weight. | |
| Invention Example V | |
| Polyethylene Glycol (av. mol. wt. 600) | 30 |
| UCON 75-H-1400[2] | 15 |
| Isopropyl Alcohol | 54 |
| Hydrochloric Acid | 1 |
| To which is added Dioctyl Phenothiazine, 0.1% by weight. | |

Notes:
[1] Trademark of Dow Chemical Company for mixed polyethylene and polypropylene glycols.
[2] Trademark of Union Carbide Corporation for heat transfer fluids.
[3] [4] Trademarks for Jefferson Chemical Company a subsidiary of Texaco, Inc. for derivatives of ethylene oxide and propylene oxide.
[5] Trademark of Röhm & Haas Company for alkyl phenyl ethers of polyethylene glycol.

The following descriptive data are taken from publications issued by the manufacturers of the proprietary trade products listed in the above Invention Examples I-V. All are listed as water-soluble:

1. "Polyglycol 15-200". Polyoxyalkaline ether containing methyl side chains and terminal hydroxyl groups. Average molecular weight 2600. Viscosity at 100° F., 200 centistokes.

2. "UCON 75-H-1400". Polyalkylene Glycol. Molecular weight not given. Viscosity at 100° F., 303 cs.

3. "Jeffox WL-1400". Polyoxyalkylene Glycol. Average mol. wt. 2500. Viscosity at 100° F., 306 cs.

4. "Jeffox WL-660". Polyoxyalkalylene Adduct of Butanol. Average mol. wt. 1800. Viscosity at 100° F., 143 cs.

I claim:

1. A radiation fusing fluid for coating solder-plated electrical circuit boards prior to heating by radiation to fuse the solder plating, said fluid being essentially a mixture of the following:
   (a) viscous water-soluble organic compounds selected from the general group consisting of: polyoxyalkylene ether containing methyl side chains and terminal hydroxyl groups; polyalkylene glycol; polyoxyalkylene glycol; polyoxyalkylene adducts of butanol: these constituting about 40 to 60 percent of the total;
   (b) a volatile solvent drivable off at the solder fusing temperature of around 204° C., constituting about 60 to 40 percent of the total;
   (c) an activator constituting about 1 to 3 percent of the total; and
   (d) at least about 0.05 percent by weight of an additive selected from the group consisting of phenothiazine and dioctyl phenothiazine.

2. A fluid as in claim 1 wherein said activator is hydrochloric acid.

3. A fluid as in claims 1 or 2 wherein said additive is phenothiazine.

4. A fluid as in claims 1 or 2 wherein said additive is dioctyl phenothiazine.

5. A fluid as in claims 1 or 2 wherein said solvent is isopropyl alcohol.

6. A fluid as in claim 5 wherein the proportion by weight of said additive is between about 0.1 and 0.2 percent.

7. A fluid as in claim 6 wherein said compounds are: polyethylene glycol, about 30 percent and polyalkylene glycol, about 15 percent; said solvent is isopropyl alcohol, about 54 percent; and said activator is hydrochloric acid, about 1 percent.

* * * * *